(12) United States Patent
Sandwith

(10) Patent No.: US 7,181,685 B2
(45) Date of Patent: Feb. 20, 2007

(54) XML GENERATOR FOR OBJECTS WITH BINARY BRANCHING TOPOLOGY

(76) Inventor: Rex Sandwith, 3532 NE. 98th St., Seattle, WA (US) 98115

( * ) Notice: Subject to any disclaimer, the term of this patent is extended or adjusted under 35 U.S.C. 154(b) by 174 days.

(21) Appl. No.: 10/808,654

(22) Filed: Mar. 24, 2004

(65) Prior Publication Data

US 2005/0216889 A1 Sep. 29, 2005

(51) Int. Cl.
*G06F 17/30* (2006.01)
(52) U.S. Cl. .............. 715/520; 707/3; 700/97; 345/420
(58) Field of Classification Search ........... 345/420, 345/835; 700/97; 382/41; 715/520
See application file for complete search history.

(56) References Cited

U.S. PATENT DOCUMENTS 5,193,125 A * 3/1993 Mahoney ............... 382/307
2002/0089549 A1* 7/2002 Munro et al. ........... 345/835
2003/0100969 A1* 5/2003 Jones ..................... 700/97

OTHER PUBLICATIONS

Ronald W.H. Verwer and Jaap van Pelt, A new method for the topological analysis of neuronal tree structures, Journal of Neuroscience Methods, 8 (1983) 335-340.

Unknown Author, NeuronC User's Manual Part III, http://retina.anatomy.upenn.edu/~rob/ncman3.html (date observed Feb. 19, 2004).

Giorgio A. Ascoli, Progress and Perspective in Computational Neuroanatomy, Preprint of article published in the journal Anatomical Record (The New Anatomist section), 257(6):195-207 (1999). http://www.krasnow.gmu.edu/ascoli/CNG/TNA/.

John C. Russ, The Image Processing Handbook, Fourth Edition, 2002 CRC Press LLC USA. pp. 436, 522, and 649.

* cited by examiner

*Primary Examiner*—Heather R. Herndon
*Assistant Examiner*—Gautam Sain
(74) *Attorney, Agent, or Firm*—R. Alan Burnett

(57) ABSTRACT

A method for generating an XML file having a nesting structure equivalent to the topology structure of an object in an image. Under the method, the topology of an object having a structure including multiple binary branches is traced, while XML elements representing nodes and describing attributes and configuration of the structure are simultaneously generated. This produces an XML file having a nesting structure describing the topology structure of the object. Attributes are added to the nodes in the XML file that specify rotations and transformations of line elements such that the geometry of the skeleton is specified. The XML file is generated in such a manner that it may be rendered as a scalar vector graphics file. The generated XML file may be used in further processing to store attributes representing physical properties of the structure without requiring a location referencing system.

17 Claims, 7 Drawing Sheets

START POINT

```
<?xml version="1.0"?>
    <line y2="10"/>
    <g transform="translate(0 10) rotate(-49.4)">
      <line y2="9.2" />
      <g transform="translate(0 9.2) rotate(-54.6)">
        <line y2="8.2"/>
      </g>
      <g transform="translate(0 9.2) rotate(70)">
        <line y2="8.5"/>
      </g>
    </g>
    <g transform="translate(0 10) rotate(45)">
      <line y2="8.5"/>
    </g>
  </g>
</svg>
```

```
<?xml version="1.0"?>
<svg width="500" height="500">
 <g transform="translate(0 0) rotate(180)">
   <line y2="10"/>
   <g transform="translate(0 10) rotate(-49.4)">
     <line y2="9.2" />
     <g transform="translate(0 9.2) rotate(-54.6)">
       <line y2="8.2" a=3/>
     </g>
     <g transform="translate(0 9.2) rotate(70)">
       <line y2="8.5" a=2/>
     </g>
   </g>
   <g transform="translate(0 10) rotate(45)">
     <line y2="8.5"/>
   </g>
 </g>
</svg>
```

XML GENERATOR FOR OBJECTS WITH BINARY BRANCHING TOPOLOGY

FIELD OF THE INVENTION

The field of invention relates generally to pattern extraction from images where the extracted pattern is later used for data storage and modeling and, more specifically but not exclusively relates to techniques for defining the topology of images using XML.

BACKGROUND INFORMATION

The extraction of the topology of shapes is a basic building block for modeling physical processes. Many natural topologies (neural anatomy and the botanical structure of plants) can be described by a binary branching tree structure (Verwer R W H, J Van Pelt, 1983, "A new method for the topological Analysis of Neuronal Tree Structures." *J Neurosci Meth*, 8, 335–351). Many organic processes such as the electrophysiological processes of the neuron are influenced by their morphological properties (Ascoli A. Giorgio, Progress and Perspectives in Computational Neuroanatomy, *Anatomical Record* (The New Anatomist section), 257(6): 195–207 (1999)).

The current state of the art models these objects as a connected series of elements. The geometry of the object is described by listing the coordinates of the elements along with a reference to the elements parent or child. This referencing system allows the topology of the object to be maintained. A drawback of this method is that adjacent elements in the object may not be adjacent in the file structure. This means a referencing system is required to navigate the elements in a manner dictated by the object being modeled.

SUMMARY OF THE INVENTION

In accordance with aspects of the present invention, techniques are disclosed for describing topology present in an image bitmap of an object by tracing the bitmap while simultaneously generating an XML file with nesting structure based on the binary branching topology of the bitmap. In one embodiment, the topology of the object is represented as a skeleton bitmap. As the skeleton is traced, grouping and line elements are added to an XML file when either 0 or 2 neighboring pixels are encountered. Attributes are added to the grouping and line elements in such a way as to retain the geometry of the skeleton. In one embodiment the element and attribute names are specified such that the generated XML files can be rendered in a scalar vector graphics (SVG) viewer. The generated XML file may be used in further processing to store attributes representing physical properties of the structure without requiring a location referencing system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Figure 1:
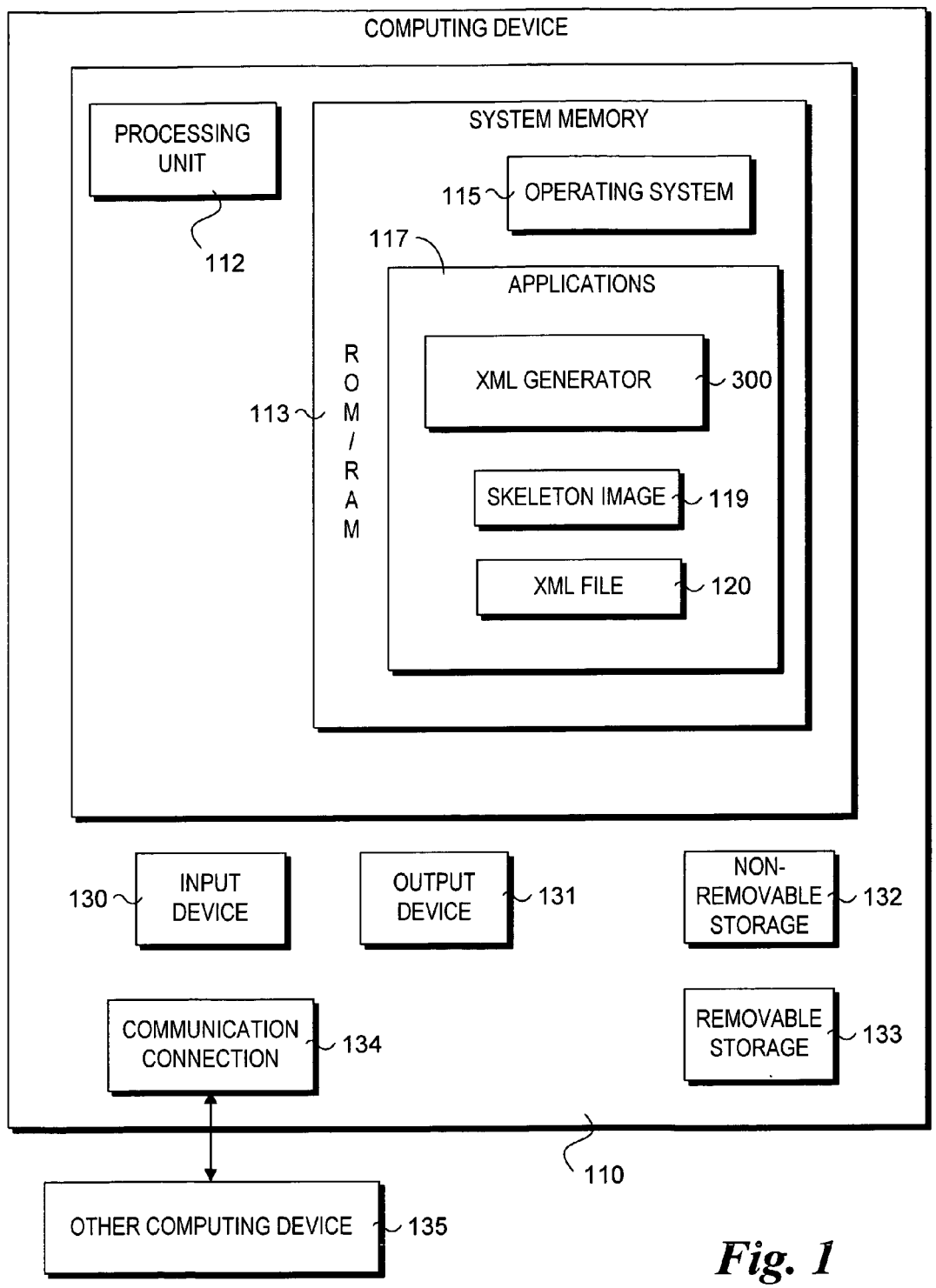
FIG. 1 illustrates an exemplary computing device that may be used in one exemplary embodiment of the present invention.

Embodiments of methods for generating XML-based documents describing the topology of objects are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification and in the claims, several terms of art are used. These terms are to take on their ordinary meaning in the art from which they come, unless specifically defined herein (such as follows) or the context of their use would clearly suggest otherwise.

Extensible markup language (XML) is specified by the W3C and can be found at (http://www.w3.org/XML/). The term element refers to the basic unit of an XML document. The element may contain attributes, other elements, content, and other building blocks for an XML document.

The term 'tag' refers to a command inserted in a document that delineates elements within XML documents. Each element usually has no more than two tags: the start tag and the end tag. It is possible to have an empty element (with no content) in which case one tag is allowed.

The content between the tags is considered the element's 'children' (or descendents). Hence, other elements embedded in the element's content are called 'child elements' or 'child nodes' of the element. Text embedded directly in the content of the element is considered the elements 'child text nodes'. Together, the child elements and the text within an element constitute that element's content.

The term 'attribute' refers to an additional property set to a particular value and associated with an element. Elements may have an arbitrary number of attribute settings associated with them, including none. Attributes are used to associate additional information with an element that is not included in the elements content.

Scalar vector graphics, SVG, is a language for describing two-dimensional vector and mixed vector/raster graphics in XML. The specification can be found at http://www.w3.org/tr/svg/).

Embodiments of the present invention take advantage of the grouping properties of SVG, namely the 'g' (or grouping) element. The 'g' element is a container element for grouping together related graphics elements. A 'g' element can contain other 'g' elements within it to an arbitrary depth. The 'transform' attribute transforms user space coordinates and lengths on sibling attributes on the given element and all of it descendents. The line elements are a graphics element that is defined by some combination of straight lines and curves. The embodiments described herein take advantage of these SVG tags to reproduce the geometry of the object.

Xpath is a language for addressing parts of an XML document and has been endorsed by the W3C.; the specification can be found at http://www.w3.org/tr/xpath. Xpath models an XML document as a tree of nodes.

With reference to FIG. 1, one exemplary system for implementing embodiments of the invention includes a computing device, such as computing device 110. Computing device 110 typically includes at least one processing unit 112 and system memory 113. System memory 113 may comprise volatile memory (such as RAM), non-volatile memory (such as ROM), or some combination of the two. The system memory 113 typically is used to store runtime instances of an operating system 115, one or more applications 117, and one or more data files 119. In one embodiment application 117 includes an XML generator 300, a skeleton bitmap file 119, and an XML document 120. Although illustrated here in the context of an XML generator 300, embodiments of the present invention has equal applicability to other types of applications, as will become apparent to those skilled in the art.

In addition to the foregoing components, device 110 may have additional features or functionality. For example, computing device 110 may also have input device(s) 130, such as a mouse, keyboard, touch input device, etc. Output device(s) 131, such as display, printers, etc. may also be included. Computing device 110 may also have additional data storage devices, such as removable storage device, 133, and non-removable storage device, 132. System memory 113, removable storage 133, and non-removable storage 132 are examples of computer storage media. Computer storage media may include removable and non-removable, volatile and non-volatile media implemented in any method or technology for storage of information, such as data structures, computer readable instructions, program modules, or other data. Computer storage media includes, but is not limited to, RAM, ROM, EEPROM, CD-ROM, flash memory or other memory technology, digital versatile disks (DVD) or other optical or magnetic storage devices.

Computing device 110 may also include communication connection 134 that allows the device to communicate with other computing devices 135. Communication connection 134 is one example of communication media. Data structures, computer readable instructions, program modules or other data in a modulated data signal may typically embody communication media. The term computer readable media as used herein includes both storage media and communication media.

Figure 2:
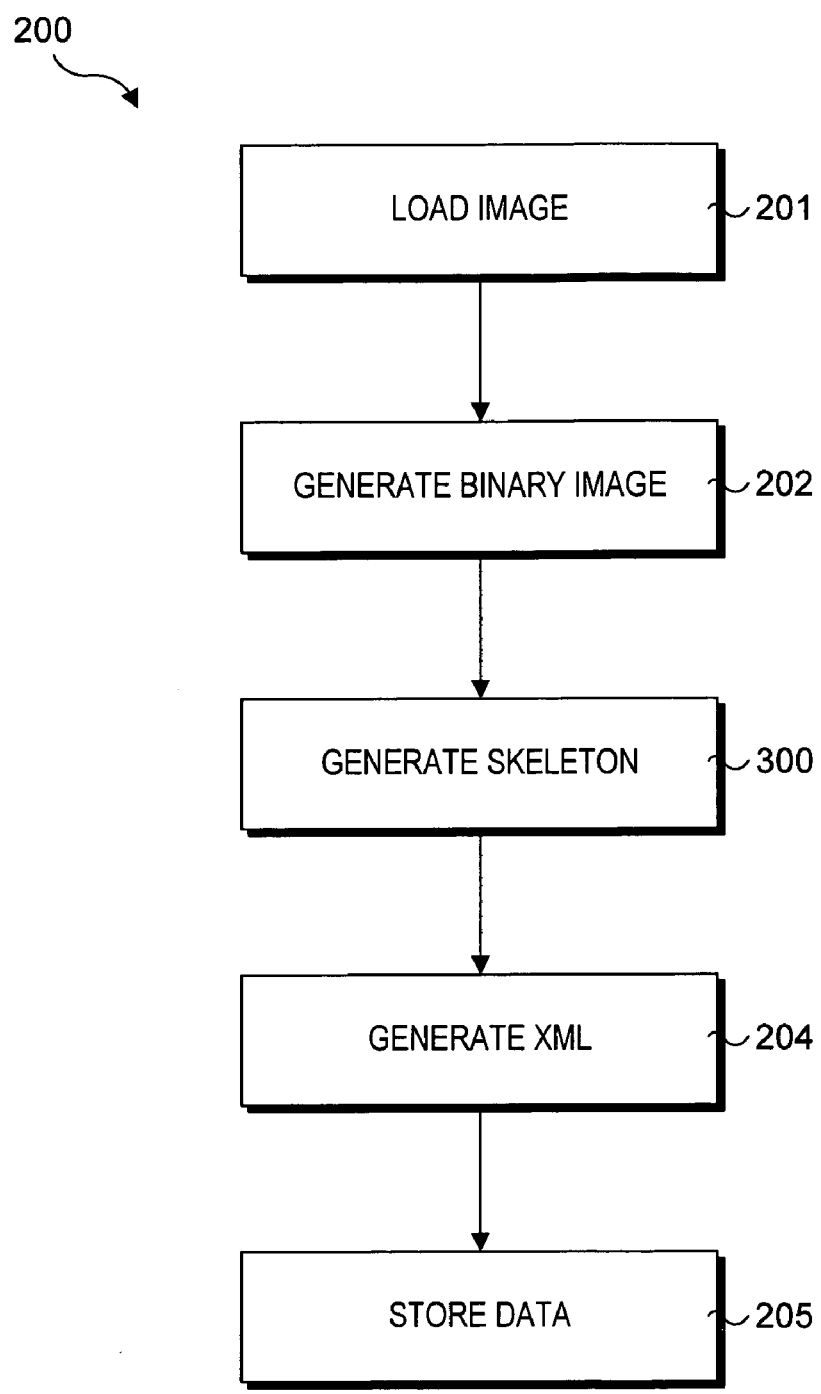
FIG. 2 is a logical flow diagram of an exemplary process for generating an XML file in accordance with the present invention.

FIG. 2 is a logical flow diagram of an exemplary process for generating an XML document in accordance with one embodiment of the invention. The exemplary process 200 includes loading a bitmap image 201, generating a binary image 202, generating a skeleton 203, generating the XML document 300, and then storing data in the XML document 205.

Step 201 involves loading a bitmap image of the object being modeled. In general, a bitmap consists of an array of pixels where each pixel is specified by a corresponding color. In one embodiment, a red, green, blue (RGB) value is specified for each pixel.

Processing continues at step 202, which generates a binary bitmap. The object to be modeled can usually be separated from the background using standard image processing techniques (e.g., see Russ, John, *The Image Processing Handbook*, 2002). Other filtering and processing techniques are applied to separate the object from the background. The processing of the image into a suitable binary image is well established and will not be discussed herein.

Figure 5:
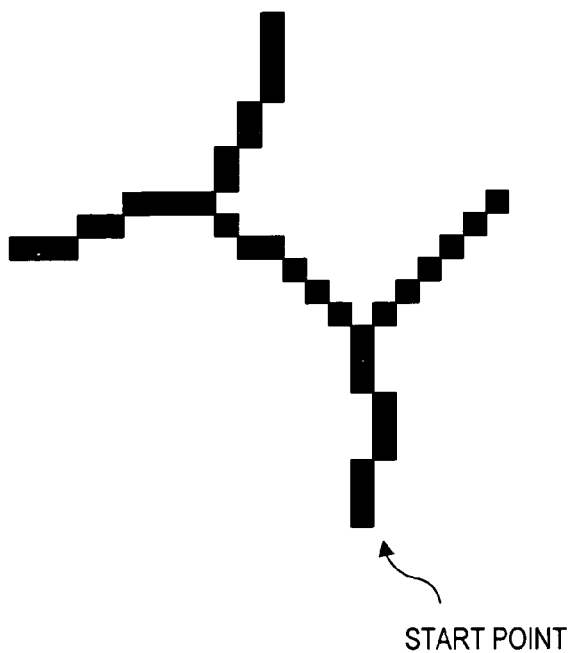
FIG. 5a shows a representative explanatory figure for a skeleton.
FIG. 5b shows an exemplary implementation of the restriction on node geometry.
Figure 5:
Figure 5:
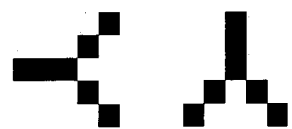

Step 203 generates a skeleton bitmap representing the topology of the object being modeled. The term 'skeleton' refers to a binary bitmap (the pixels are either white or black). In one embodiment, all foreground pixels can have three neighboring foreground pixels at most. Those foreground pixels that have three neighbors are considered nodes, those with only one neighbor are considered endpoints, and those with two neighbors are considered part of line elements. FIG. 5a shows an exemplary skeleton with the starting pixel specified. In one embodiment, a further restriction on the node geometry is applied such that pixels adjacent to nodes cannot be touching. An exemplary implementation of this restriction is shown in FIG. 5b. All lines in the skeleton have parent lines except the root, or first, line, which has no parents. A child line is defined as the line element with a start point located at a terminal point of a parent line. Each parent line has two child lines. In one embodiment, another restriction on the skeleton is that it has no looping morphology. The skeleton can be generated using well-known morphological thinning techniques discussed in the literature, such as disclosed in U.S. Pat. No. 5,574,803, incorporated herein in its entirety by reference. This is well documented in the literature and will not be discussed further herein; (e.g., see http://www.dai.ed.ac.uk/HIPR2/skeleton.htm, Russ, John, *The Image Processing Handbook*, 2002).

Figure 3:
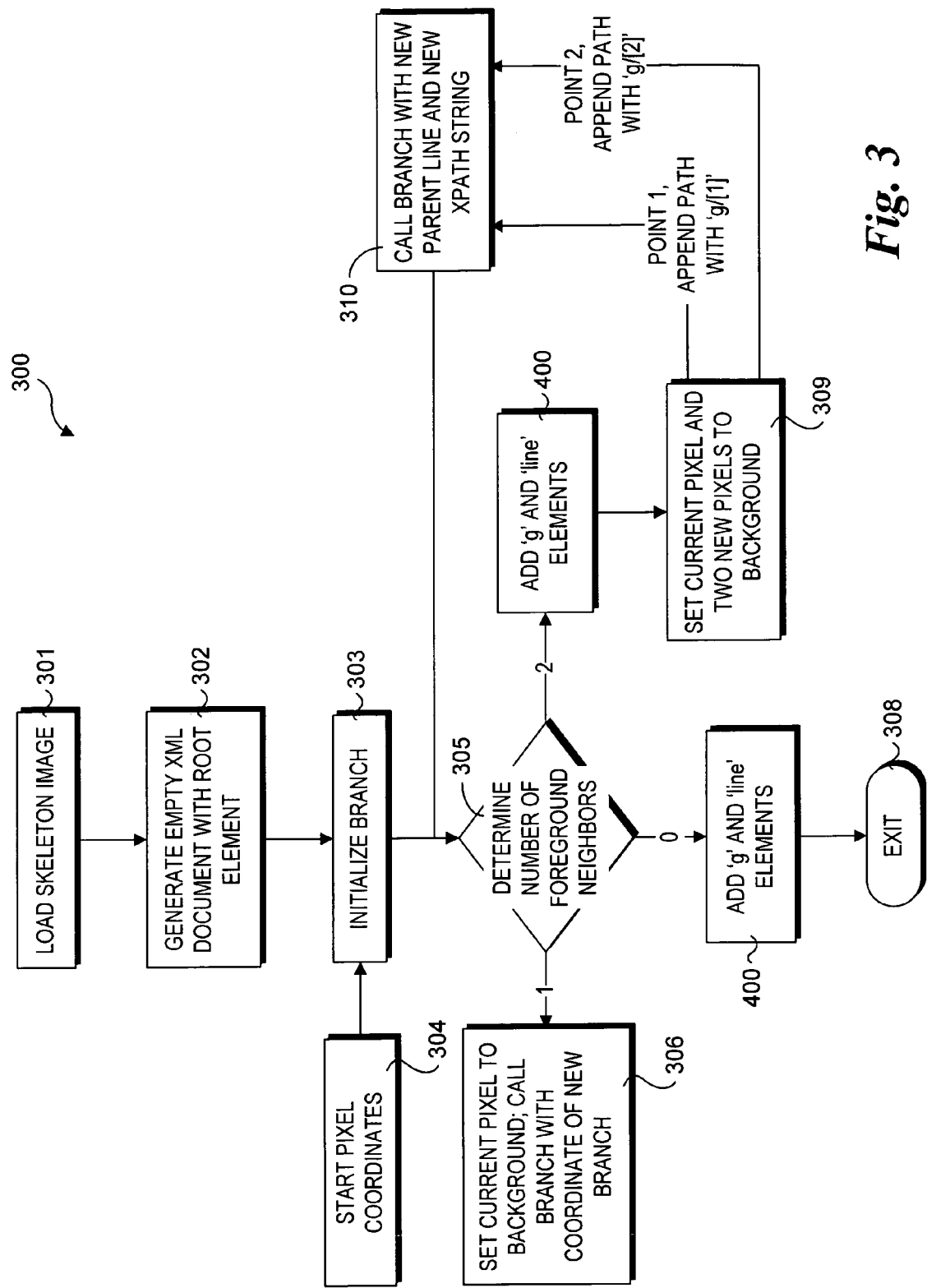
FIG. 3 is a logical flow diagram of an exemplary process for tracing a skeleton in accordance with the present invention.

FIG. 3 is a logical flow diagram 300 of an exemplary process for generating an XML document in accordance with one embodiment of the invention. The process begins at Step 301, which loads a skeleton representing the topology of the object being modeled. The process continues to step 302 where a root element is created in an empty XML document. In one embodiment the root element name is 'svg'. Processing continues at steps 303 and 304, where the branch subroutine 305 is initialized with the coordinates of the starting pixel located on an endpoint of one of the branches in the skeleton. The node location within the XML document must be maintained while tracing the skeleton. XPath models an XML document as a tree of nodes. In one embodiment an XPath string is used to specify this location.

In further detail, step 305 recursively calls itself with the XPath string, the coordinates of the parent line, the starting point of the current line and the current point being traced on the skeleton. Step 305 examines the eight pixels adjacent to the current pixel, four diagonal and four on the side, to determine if any are part of the skeleton. RGB values are used to differentiate the skeleton from the background. In one embodiment, the skeleton is defined as being composed of black pixels where the RGB value is (0,0,0) and the background is set to white (255,255,255). If there is only one neighboring pixel then processing continues to step 306. Step 306 sets the selected pixel to the background color to avoid retracing the skeleton. It then calls step 305 again with the coordinates of the selected pixel.

If zero neighboring pixels are found in step 305, then processing continues to step 400. In one embodiment, step 400 adds a grouping and line element to the XML file using the coordinates of the parent and child lines (block 400). Processing then continues to step 308 where the subroutine exits.

Figure 6:
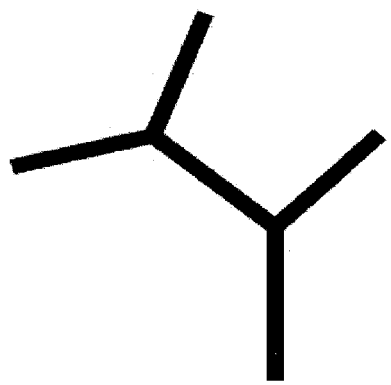
FIG. 6a shows a representative XML file in accordance with the present invention.
FIG. 6b shows a representative SVG image in accordance with the present invention.
Figure 6:

If two neighboring pixels are found in step 305, then processing continues to step 400. In one embodiment step 400 adds a grouping and line element to the XML file using the coordinates of the parent and child lines and Xpath string. Processing continues to step 309 where the selected pixels are set to background color. Processing continues to step 310, where step 305 is called twice using the coordinates of the two selected points. Step 310 updates the parent line coordinates. Step 310 also appends the first points XPath string with '/g[1]' and appends the second points Xpath string with '/g[2]'. FIG. 6a shows the XML file listing generated from this process using the exemplary skeleton 5a. FIG. 6b is shows the result of rendering the XML code of FIG. 6a with an SVG viewer.

Figure 4:
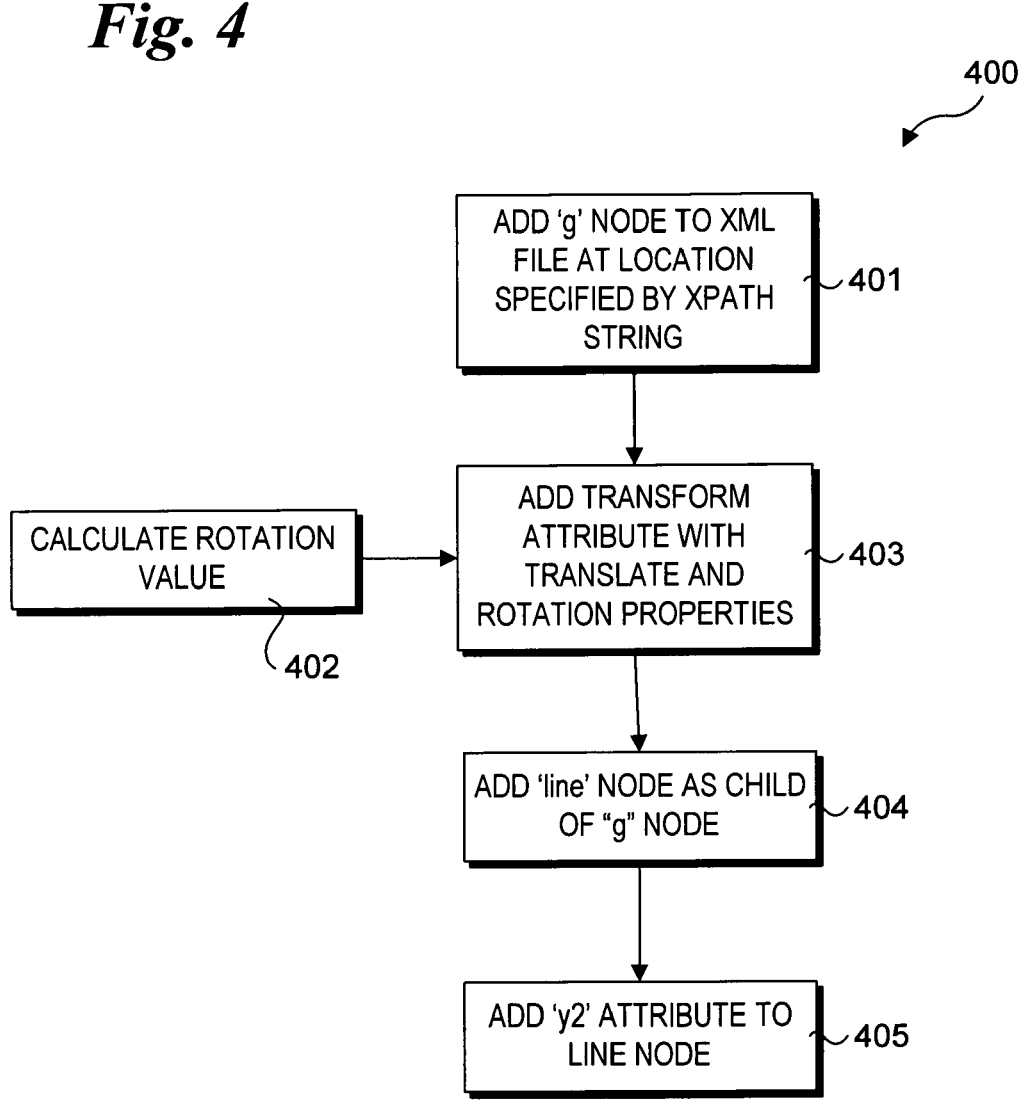
FIG. 4 is a logical flow diagram of an exemplary process for adding line elements to the XML file in accordance with the present invention.

FIG. 4 is a logical flow diagram 400 of an exemplary process for generating an XML document in accordance with one embodiment of the invention. The process starts at step 401, which adds a grouping element to the XML document at a location specified by the XPath string. In one embodiment the grouping elements name is 'g'. Processing continues to step 402, where the angle the parent line would be rotated to align with the child line is calculated. Processing continues at step 403 where attributes are added to the grouping element that specify the transformation which will be applied to the line element added at step 404. In one embodiment the attribute name is 'transformation' with property names 'translation' and 'rotation'. In SVG, the translation property is defined by an 'x' and 'y' value and the rotation property is defined by an angle. In one embodiment, the 'x' value is set to '0' and the 'y' value is set to the length of the parent line. Processing continues at step 404, where a line element is added as a child of the grouping element. In one embodiment the line element name is 'line'. Processing continues to Step 405, which adds a length attribute to the line element. In one embodiment the name of the attribute is 'y2' and the value of the attribute is length of the line.

Figure 7:
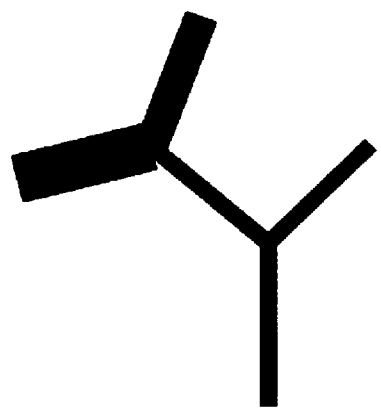
FIG. 7a shows a representative XML file listing showing the application of the present invention for data storage.
FIG. 7b shows a representative SVG image in accordance with the present invention for data storage.
Figure 7:

Processing continues at block 205 in FIG. 2. Block 205 demonstrates how attributes can be added to the line elements of the XML document. FIG. 7a shows an exemplary file-listing showing the attribute 'a' has been added to the 8.2 and 8.5 length lines. Attribute 'a' has been set to '3' for the 8.2 length line and to '2' for the 8.5 lines. FIG. 7b shows FIG. 7a rendered in an SVG viewer. Note how the width of the lines has been modified to reflect the attribute values.

It is contemplated that embodiments of the invention may be configured as a software-based XML generator. Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The techniques described above provide several advantages over the prior art. One advantage is that the data structure (i.e., the XML document) is generated to match the topology of the object being modeled. This removes the need for a referencing system when navigating the structure in a connected fashion. The logic of the object is the structure of the data itself. This simplifies the modeling of a process where the topology of the structure determines local interactions. For example, the electrophysiological processes of neurons are modeled as a series of compartments, where the state of a compartment at the next time step is determined by the state of its neighboring compartments (see, e.g., Schilstra, M, "A finite state automaton model for multi-neuron simulations," *Neurocomputing* 44–46 (2002) 1141–1148). Furthermore, this simplifies the modeling process because selection of the neighboring elements is achieved by selecting neighboring nodes in the XML file. Another advantage is that once the topology of the object is expressed in XML, attributes can be added to the line elements to store physical characteristics of the object. Attributes saved in the line elements can be easily selected using standard XML navigation tools. In addition to duplicating the nesting structure, some embodiments may also retain the geometry of the object if appropriated SVG tags are used to generate the XML file. Also, when the XML file is generated using SVG tags it can be rendered in a web browser using a SVG viewer. Such an SVG viewer can be found at http://www.adobe.com/SVG/main.html.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method to express a topological structure of an object in an image including a plurality of binary branches, comprising:
   generating a bitmap skeleton of the object;
   tracing the bitmap skeleton from a suitable end point on the skeleton and recursively selecting adjacent pixels of the bitmap skeleton to identify lines, nodes and endpoints; and
   adding line and grouping elements to an extended markup language (XML) file based on the lines, nodes and endpoints that are identified to generate an XML file including elements and having a nesting structure describing the topology structure of the object.

2. The method of claim 1 where the adding of line and grouping elements to the XML file further comprises:
   adding a line element as a child of a grouping element;
   adding a transform attribute to the grouping element with rotation and translation properties, wherein the translation value is indicative of the length of the parent line and the rotation values is indicative of an angle the parent line would be rotated to align with the child line; and
   adding an attribute to the line element with a value equal to the length of the child line.

3. The method of claim 1, wherein the XML file that is generated is used to store attributes representing physical properties of the topology structure without requiring a location referencing system.

4. The method of claim 1, wherein the bitmap skeleton comprises a bitmap having a foreground color defining skeleton pixels and a background color, and wherein lines, nodes, and endpoints are identified by performing operations comprising:
   determining, for a current pixel, a number of neighbor pixels having a foreground color; and
   if the number of neighbor pixels having a foreground color is one, setting the current pixel to a background color and selecting the neighbor pixel with the foreground color as a new current pixel.

5. The method of claim 4, further comprising:
   if the number of neighbor pixels having a foreground color is two,
   identifying the current pixel is a node;
   setting the current pixel and each of the two neighbor pixels with the foreground color to the background color;
   starting at a first of the two neighbor pixels, recursively selecting adjacent pixels to trace a path of a first branch connected to the node; and
   starting at a second of the two neighbor pixels, recursively selecting adjacent pixels to trace a path of a second branch connected to the node.

6. The method of claim 4, further comprising:
   if the number of neighbor pixels having a foreground color is zero,
   identifying the current pixel as an endpoint of a line; and
   adding an attribute in a corresponding element in the XML file indicative of a length of the line.

7. A computer-readable medium having instructions stored thereon, which when executed express a topological structure of an object in an image including a plurality of binary branches by performing operations, including:
   generating a bitmap skeleton of the object;
   tracing the bitmap skeleton from a suitable end point on the skeleton and recursively selecting adjacent pixels of the bitmap skeleton to identify lines, nodes and endpoints; and
   adding line and grouping elements to an extended markup language (XML) file based on the lines, nodes and endpoints that are identified to generate an XML file including elements and having a nesting structure describing the topology structure of the object.

8. The computer-readable medium of claim 7, wherein the bitmap skeleton comprises a bitmap having a foreground color defining skeleton pixels and a background color, and wherein execution of the instructions identifies lines, nodes, and endpoints by performing operations including:
   determining, for a current pixel, a number of neighbor pixels having a foreground color; and
   if the number of neighbor pixels having a foreground color is one, setting the current pixel to a background color and selecting the neighbor pixel with the foreground color as a new current pixel.

9. The computer-readable medium of claim 8, wherein execution of the instructions further performs operations including:
   if the number of neighbor pixels having a foreground color is two,
   identifying the current pixel is a node;
   setting the current pixel and each of the two neighbor pixels with the foreground color to the background color;
   starting at a first of the two neighbor pixels, recursively selecting adjacent pixels to trace a path of a first branch connected to the node; and
   starting at a second of the two neighbor pixels, recursively selecting adjacent pixels to trace a path of a second branch connected to the node.

10. The computer-readable medium of claim 8, wherein execution of the instructions further performs operations including:
    if the number of neighbor pixels having a foreground color is zero,
    identifying the current pixel as an endpoint of a line; and
    adding an attribute in a corresponding element in the XML file indicative of a length of the line.

11. The computer-readable medium of claim 7, wherein execution of the instructions performs the adding of line and grouping elements to the XML file by performing the further operations of:
    adding a line element as a child of a grouping element;
    adding a transform attribute to the grouping element with rotation and translation properties, wherein the translation value is indicative of the length of the parent line and the rotation values is indicative of the angle the parent line would be rotated to align with the child line;
    adding an attribute to the line element with a value equal to the length of the child line.

12. The computer-readable medium of claim 7, wherein the XML file that is generated is used to store attributes representing physical properties of the topology structure without requiring a location referencing system.

13. The computer-readable medium of claim 7, wherein execution of the instructions further performs the operation of enabling attributes indicative of physical characteristics of the object to be added to the XML file.

14. A method to express a topological structure of an object in an image, comprising:
    generating a bitmap corresponding to the image including a bitmap skeleton of the object;
    tracing the bitmap skeleton from a suitable end point on the skeleton to identify lines, nodes and end points of the bitmap skeleton; and
    adding line and grouping elements to an XML file in consideration of the lines, nodes and endpoints that are identified, where the adding of line and grouping elements to the XML file includes,
       adding a line element as a child of a grouping element;
       adding a transform attribute to the grouping element with rotation and translation properties, wherein the translation value is indicative of the length of a parent line and the rotation value is indicative of an angle between the parent line and the child line; and adding an attribute to the line element with a value indicative of a length of the child line.

15. The method of claim 14, wherein the bitmap skeleton comprises a bitmap having a foreground color defining skeleton pixels and a background color, and wherein lines, nodes, and endpoints are identified by performing operations comprising:

determining, for a current pixel, a number of neighbor pixels having a foreground color; and identifying whether the current pixel corresponds to a line, a node, or an endpoint depending on the number of neighbor pixels having the foreground color.

16. The method of claim 14, wherein selective branches of the bitmap skeleton may have a different width than other branches of the bitmap skeleton, the method further comprising:

adding attributes to line elements of the XML file corresponding the selective branches indicative of a width of the selective branches.

17. The method of claim 14, wherein the XML file may be rendered by an Scalar Vector Graphics (SVG) viewer to reproduce the object.

* * * * *